(12) United States Patent
Satoh et al.

(10) Patent No.: US 6,272,028 B1
(45) Date of Patent: Aug. 7, 2001

(54) POWER CONVERTER APPARATUS

(75) Inventors: Kazuhiro Satoh; Ryo Nakajima; Kosaku Ichikawa, all of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/649,001

(22) Filed: Aug. 28, 2000

(30) Foreign Application Priority Data

Sep. 6, 1999 (JP) .................................................. 11-251051

(51) Int. Cl.[7] .................................................. H02H 7/122
(52) U.S. Cl. .......................................... 363/56.05; 363/141
(58) Field of Search ................................. 363/56.05, 141, 363/98, 132

(56) References Cited

U.S. PATENT DOCUMENTS 5,638,266 * 6/1997 Horie et al. ........................... 363/137

FOREIGN PATENT DOCUMENTS

| 7-56629 | 2/1990 | (JP) . |
| 11-89249 | 3/1999 | (JP) . |

* cited by examiner

Primary Examiner—Shawn Riley
(74) Attorney, Agent, or Firm—Foley & Lardner

(57) ABSTRACT

A power converter apparatus, including a DC power source, a semiconductor stack, connected to the DC power source in parallel, having a plurality of semiconductor devices and a cooler for refrigerating the semiconductor devices, the semiconductor devices and the cooler are stacked and pressured to each other, and a snubber circuit, connected to the DC power source in parallel, having a serial circuit of a capacitor and a diode, and a resistor connected in parallel to the diode, one terminal of the capacitor is disposed adjacent to the semiconductor stack so that magnetic flux generated by current flowing in the terminal cancels magnetic flux caused by current flowing in the semiconductor stack.

9 Claims, 6 Drawing Sheets

POWER CONVERTER APPARATUS

CROSS REFERENCE TO RELATED APPLICATION

This application claims benefit of priority to Japanese Patent Application No. 11-251051 filed Sep. 6, 1999, the entire content of which is incorporated by reference herein.

BACKGROUND OF THE INVENTION

1. Field of the Invention

This invention relates to a power converter apparatus that uses high-speed semiconductor switching devices and includes a snubber circuit for restraining a surge voltage, and especially to a wiring structure of the snubber citcuit.

2. Discription of the Background

In recent years, power semiconductor switching devices for power converters or power inverters remarkably advance inhigh-speedswitching. Forexample, GCT (Gate-communicated Thyristor) is a current gate trigger type of high-speed semiconductor switching device, and IGBT (Insulated Gate Bipolar Transistor) and IEGT (Injection Enhanced Gate Transistor) are voltage gate trigger types of high-speed semiconductor switching devices. These high-speed semiconductor switching devices, which are capable of switching a voltage of 3–6 KV (Kilo-Volts) and a current of 3–4 KA (Kilo-Amperes), have been developed and made practical. Further, since a dV/dt resistance of a semiconductor switching device atatime of turningoff has been improved, it is attempted that a snubber circuit is made smaller in size and less loss.

FIG. 1 is a circuit diagram showing a conventional NPC (Neutral Point Clamped) inverter that uses GTO (Gate Turn-off Thyristor) as a semiconductor switching device. Snubber circuits 2a, 3a, 4a and 5a are respectively connected to GTO switching devices 2, 3, 4 and 5. Each of the snubber circuits 2a–5a restrains a surge voltage generated at switching the GTO switching devices 2–5 and includes a capacitor, a diode and a resistor.

In recent years, as highly efficient GCT, IGBT and IEGT are put to practical use, a cramp snubber circuit or a capacitor are come to be connected to a DC (Direct Current) power source. These high-speed semiconductor switching devices are able to switch off acurrent of several KA (Kilo-Amperes) up to 0 (zero) in 1–2 micro-seconds as a matter of their behavior. At the time of switching off a large current, a surge voltage represented by the product of a wiring inductance and a rise rate of current (dI/dt) is generated. If a peak of the surge voltage or a rise rate of voltage (dV/dt) are beyond capacity to resist voltage of a semiconductor switching device, the semiconductor switching device may be broken for ever. Therefore, it is important that the surge voltage be less than the capacity to resist voltage of the semiconductor switching device.

However, in a large capacity type of power converter that uses high-speed semiconductor switching devices, since either one of a charge and discharge snubber circuit or a clamp snubber circuit is connected to each of the semiconductor switching devices, the power converter becomes large in size and costly. Accordingly, it is desired to provide a device to restrain a surge voltage by only cramp snubber circuit connected to a DC power source in the same way as a power converter using semiconductor switching devices having small capacity to resist voltage. That is, it is desired to provide a device to restrain a surge voltage without attaching a snubber circuit to each of the semiconductor switching devices.

SUMMARY OF THE INVENTION

Accordingly, one object of this invention is to provide a power converter apparatus which may reduce a surge voltage generated at switching a semiconductor switching device and protect the semiconductor switching device from the surge voltage.

The present invention provides a power converter apparatus, including a DC power source, a semiconductor stack, connected to the DC power source in parallel, having a plurality of semiconductor devices and a cooler for refrigerating the semiconductor devices, the semiconductor devices and the cooler are stacked and pressured to each other, and a snubber circuit, connected to the DC power source in parallel, having a serial circuit of a capacitor and a diode, and a resistor connected in parallel to the diode, one terminal of the capacitor is disposed adjacent to the semiconductor stack so that magnetic flux generated by current flowing in the terminal cancels magnetic flux caused by current flowing in the semiconductor stack.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

The present invention is hereinafter described in detail by way of an illustrative embodiment.

(First Embodiment)

A three-level NPC inverter apparatus using IEGT of a first embodiment of the present invention is explained referring to FIGS. 2–8.

Figure 1:
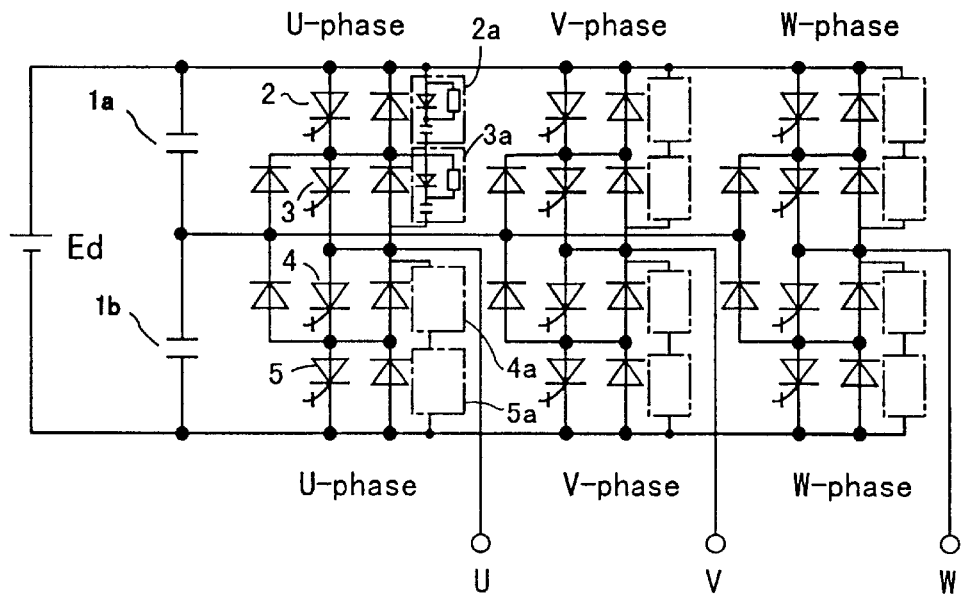
FIG. 1 is a circuit diagram showing a main circuit of a conventional three-level NPC inverter apparatus that uses GTO.
Figure 2:
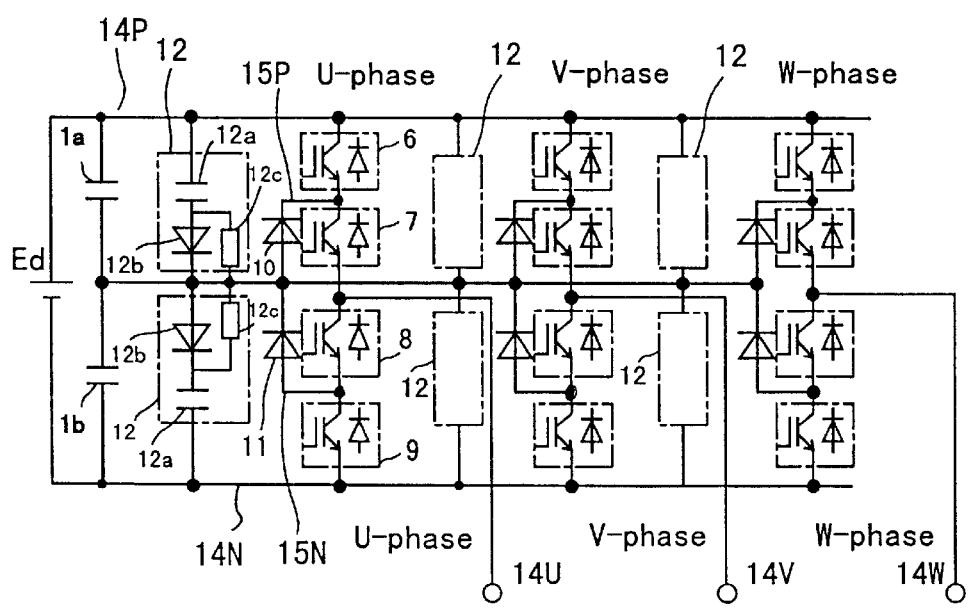
FIG. 2 is a circuit diagram showing a main circuit of a three-level NPC inverter apparatus of a first embodiment of the present invention.

As shown in FIG. 2, a main circuit of the NPC inverter apparatus of the first embodiment includes a DC power source having smoothing capacitors 1a and 1b, a U-phase circuit, a V-phase circuit and a W-phase circuit. The capacitor 1a is connected between a positive electrode of the DC power source and a neutral point thereof. The capacitor 1b is connected between a negative electrode of the DC power source and the neutral point thereof. The respective U, V and W-phase circuits are connected to the DC power source and have the same formation each other. The U-phase circuit includes semiconductor switching devices 6, 7, 8 and 9, first and second connecting diodes 10 and 11, and two snubber circuits 12. Each of the semiconductor switching devices 6–9 includes an IEGT and a diode connected in anti-parallel to the IEGT. The respective snubber circuits 12 are connected between the positive electrode and the neutral point, and the negative electrode and the neutral point respectively. Each of the snubber circuits 12 includes a snubber capacitor 12a, a snubber diode 12b and a discharge resistor 12c.

A semiconductor stack 18 mounting the above described main circuit is hereinafter described.

In general, the main circuit is refrigerated by an air-cooling or a water-cooling.

Figure 3:
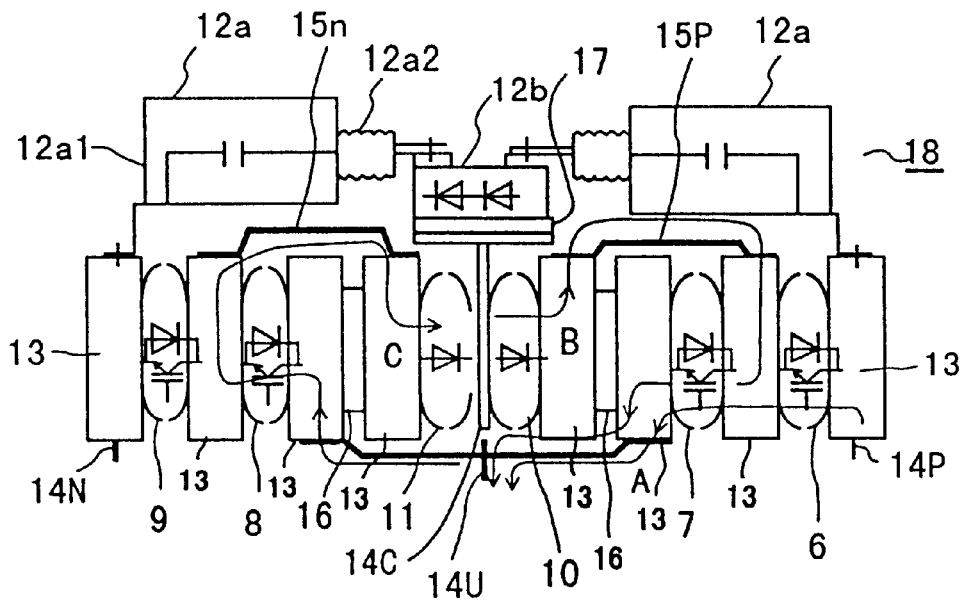
FIG. 3 is a schematic front view of a semiconductor stack of the first embodiment.
Figure 4:
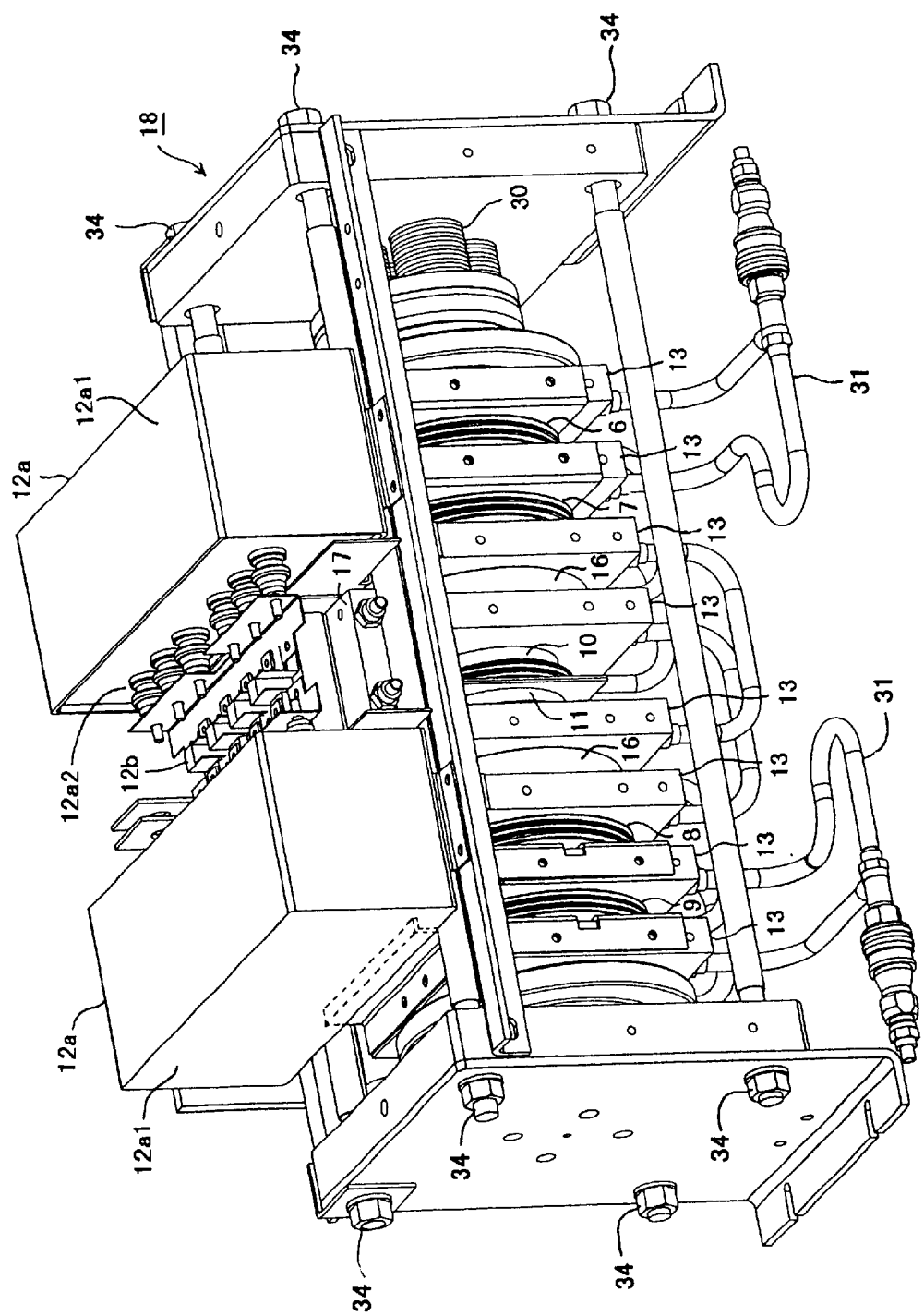
FIG. 4 is a perspective view of the semiconductor stack of the first embodiment.

FIGS. 3 and 4 show a water-cooling type of the semiconductor stack 18 that includes the U-phase circuit in FIG. 2. Cooling pipes 31 for the water cooling are shown in FIG. 4.

As shown in FIGS. 3 and 4, the first and second connecting diodes 10 and 11, which are connected in serial to each other putting a neutral point bus-bar 14C, are disposed in the middle of the semiconductor stack 18. That is, the bus-bar 14C is connected to a neutral point of the first and second connecting diodes 10 and 11. In FIG. 3, the right side of the neutral point is a positive side of the DC power source, and the left side of the neutral point is a negative side of the DC power source. The first connecting diode 10, an insulating spacer 16, the semiconductor switching devices 6 and 7, and cooling fins 13 for refrigerating the semiconductor switching devices 6 and 7 are disposed on the positive side of the semiconductor stack 18. Likewise, the second connecting diode 11, an insulating spacer 16, the semiconductor switching devices 8 and 9, and cooling fins 13 for refrigerating the semiconductor switching devices 8 and 9 are disposed on the negative side of the semiconductor stack 18.

The semiconductor switching devices 6–9, the connecting diodes 10 and 11, the cooling fins 13, and the insulating spacers 16 are stacked and pressured to each other at a predetermined pressure.

The semiconductor stack 18 as constructed above is connected to the DC power source and the snubber circuits 12.

Each case 12a1 of the snubber capacitors 12a is made of brass or the like and forms terminal. The cases 12a1 are disposed adjacent to the semiconductor stack 18 so that magnetic flux generated by current flowing in the case 12a1 (terminal) cancels magnetic flux caused by current flowing in the semiconductor stack 18, and connected to the cooling fins 13 directly. Each of the other terminals of the snubber capacitors 12a is divided into six terminals and includes an insulator 12a2 insulating from the case 12a1 as shown in FIG. 4. The respective plural termainals are connected to terminals (an anode or a cathode) of the snubber diodes 12b. The other terminals of the snubber diodes 12b are the neutral point and are directly connected to a cooling fin 17 for refrigerating the snubber diodes 12b. That is, the cooling fin 17 is connected to the neutral point.

Figure 5:
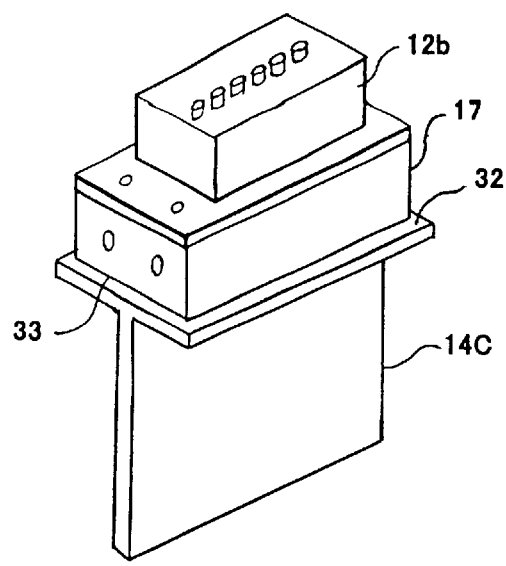
FIG. 5 is a perspective view of a neutral point bus-bar of the first embodiment.

As shown in FIG. 5, the cooling fin 17 that functions to connect the terminals of the snubber diodes 12b and to refrigerate the snubber diodes 12b is secured to the neutral point bus-bar 14C forming a neutral point of the NPC inverter apparatus. As shown in FIGS. 3 and 5, the bus-bar 14C is fixed between an anode and a cathode of the connecting diodes 10 and 11 disposed in a middle of the semiconductor stack 18 and formed in a shape of T. An area of a fixing plane 32 of the T-shaped bus-bar 14C is larger than an area of a fixing plane 33 of the cooling fin 17.

In the above description, although the bus-bar 14C is formed in a shape of T, the bus-bar may be shaped in an inverse L. In this case, an anode and a cathode of the connecting diodes 10 and 11 are connected to the L-shaped bus-bar. As long as an area of a fixing plane of the L-shaped bus-bar is more than half area of the fixing plane 33 of the cooling fin 17, the same effect as the T-shaped bus-bar 14C may be achieved.

Figure 6:
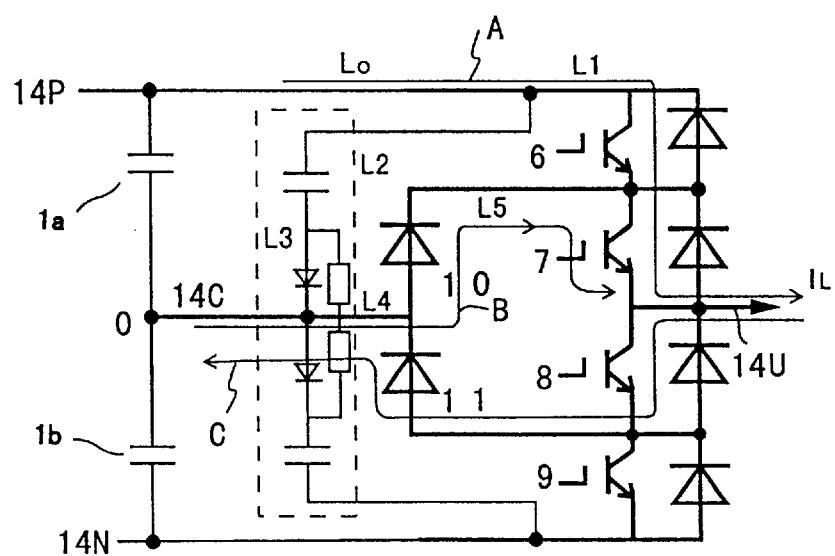
FIG. 6 is a circuit diagram showing current flows of a U-phase circuit of the NPC inverter apparatus of the first embodiment.

In the semiconductor stack 18 of the first embodiment, electric modes of the NPC inverter apparatus that outputs a positive level, a neutral level and a negative level are explained referring to FIGS. 3 and 6.

A description of an output mode of the negative level is omitted, because a current direction of an output mode of the positive level is merely reversed.

An arrow A in FIG. 6 shows an output mode of the positive level of the U-phase circuit.

A current flows in a course of a positive bus-bar 14P, the semiconductor switching device 6, the semiconductor switching device 7, and an output bus-bar 14U. As to the semiconductor stack 18 having the semiconductor switching devices 6 and 7 shown in FIG. 3, a current flows in a course of the positive bus-bar 14P, the cooling fin 13, the semiconductor switching device 6, the cooling fin 13, the semiconductor switching device 7, the cooling fin 13, and the output bus-bar 14U as indicated by an arrow A in FIG. 3.

Arrows B and C in FIG. 6 show an output mode of the neutral level of the U-phase circuit.

A current flows in a course of the neutral point bus-bar 14C, the connecting diode 10, the semiconductor switching device 7, the output bus-bar 14U, the semiconductor switching device 8, the connecting diode 11, and the neutral point bus-bar 14C. As to the semiconductor stack 18 having the connecting diode 10 and the semiconductor switching device 7 shown in FIG. 3, a current flows in a course of the bus-bar 14C, the connecting diode 10, the cooling fin 13, a bus-bar 15P, the cooling fin 13, the semiconductor switching device 7, the cooling fin 13, and the output bus-bar 14U as indicated by the arrow B in FIG. 3, and further a current flows in a course of the output bus-bar 14U, the cooling fin 13, the semiconductor switching device 8, the cooling fin 13, a bus-bar 15N, the cooling fin 13, the connecting diode 11 and the neutral point bus-bar 14C.

Figure 7:
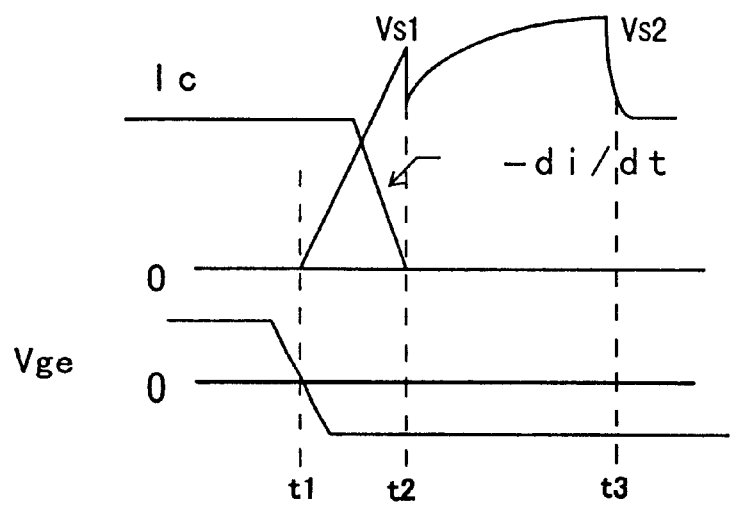
FIG. 7 shows a wave form of a surge voltage that applies to a semiconductor switching device of the NPC inverter apparatus of the first embodiment.

The reason that a surge voltage is generated at the output modes is explained referring to FIG. 7.

Where a current IL flows in a condition that the semiconductor switching devices 6 and 7 turn on, if a gate voltage Vge of the semiconductor switching device 6 is made negative bias at a time t1 shown in FIG. 7, the semiconductor switching device 6 turns off, thereby increasing a voltage applying to the semiconductor switching device 6 and reducing a current Ic flowing into the semiconductor switching device 6. A surge voltage, which is caused by a rate of the current change (−dI/dt) and a wiring inductance of the main circuit of the NPC inverter apparatus, is applied to the semiconductor switching device 6. A surge voltage Vs1 generated at a time t2 in FIG. 7 is represented by the following formula 1. To restrain the surge voltage, it is needed to reduce the wiring inductance and to provide a diode that possesses a low transient ON voltage.

$$Vs1 = V_0 + L * \frac{dI}{dt} + Vfr \qquad \text{(Formula 1)}$$

A surge voltage Vs2 generated at a time t3 in FIG. 7 is represented by the following formula 2.

$$Vs2 = V_0 + \left(\sqrt{\frac{L_0}{C}}\right) * Ic \quad \text{(Formula 2)}$$

$V_0$ is a DC voltage. $L_0$ is a wiring inductance from the smoothing capacitor 1a to the snubber circuit 12. L is the sum of wiring inductances of L1, L2, L3, L4 and L5. C is a capacity of the snubber capacity. Vfr is a transient ON voltage of the snubber diode 12b.

According to the first embodiment, since each of the cases 12a1 of the snubber capacitors 12a itself forms a terminal connected to the cooling fin 13 directly and the terminals of the snubber capacitors 12a are disposed adjacent to the semiconductor stack 18 so that magnetic flux generated by current flowing in the terminals cancels magnetic flux caused by current flowing in the semiconductor stack 18, a wiring inductance of the NPC inverter apparatus may be minimized, thereby restraining a surge voltage that applies to the semiconductor switching devices 6–9. As a result, it is unnecessary to provide a snubber circuit to each of the semiconductor switching devices 6–9.

Further, wirings and components constituting the snubber circuits 12 may be reduced in size. Furthermore, man-hours for assembly of the NPC inverter apparatus may be reduced.

Figure 8:
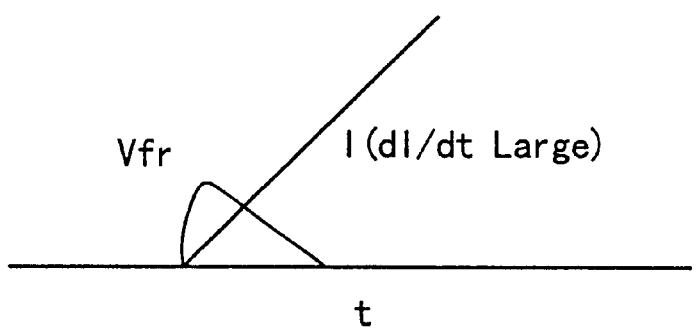
FIG. 8 shows a wave form of a transient ON voltage of a diode of the NPC inverter apparatus of the first embodiment.

In the above NPC inverter apparatus, the snubber diode 12b possesses a low transient ON voltage. As shown in FIG. 8, a large voltage Vfr is generated at a time that a current with a large rate of current change (dI/dt) starts to flow into a diode, that is, while the electrons spread in all fields of a pellet of the diode.

As indicated in the formula 1, the transient ON voltage Vfr of the snubber diode 12b is a important factor for the surge voltage Vsl that applies to the semiconductor device 6. Therefore, a plurality of snubber diodes 12b that possess a low transient ON voltage are connected both in parallel and in serial. If the snubber diodes are connected in serial, a diode having a low voltage resistance may be used as a snubber diode. It is generally known that the diode having a low voltage resistance has a property of exceedingly low transient ON voltage.

If the snubber diodes are connected in parallel to each other, currents flowing in the snubber diodes are shared with the plural snubber diodes. Consequently, a transient ON voltage shown in FIG. 8 is divided by the number of the snubber diodes.

Further, it is required to dispose the cooling fins 13 for refrigerating the semiconductor switching devices 6–9, the connecting diodes 10 and 11, the bus-bars 15P, 15N and 14U adjacently to each other in order to reduce a wiring inductance. In this embodiment, the insulating plates 16 are inserted between the cooling fins 13.

There are two ways to fix the insulating plates 16. One is an adhesive fixation. Another is a screw fixation. As to the adhesive fixation, the strength of adhesive may become weak due to a cooling air. As to the screw fixation, since a screw is made of an insulator, the screw may become lose as years go by. Further, since holes are formed at screwed positions, reliability of electric non-conductance may be reduced.

To avoid the above problem, bridge types of the bus-bars 15P, 15N and 14U are all covered with an insulator except for terminals thereof. For example, an epoxy insulating covering or a thermal contraction tube are used.

According to the first embodiment, since a distance between the cooling fins 13 and lengths of the bus-bars 15P, 15N and 14U are minimized, a wiring inductance may be reduced, thereby minimizing a surge voltage that applies to the semiconductor switching devices at three-level electric modes of the NPC inverter apparatus.

Further, the semiconductor switching devices 6–9 and the cooling fins 13 expand with heat generated by IEGT and the connecting diodes 10 and 11. As shown in FIG. 4, the semiconductor stack 18 is fastened with bolts 34 at a predetermined pressure. That is, the semiconductor switching devices 6–9, the connecting diodes 10 and 11, and the cooling fins 13 are bound with the bolts 34. In case that a thermal stress caused by thermal expansion adds to an initial pressure of the semiconductor stack 18, the total pressure maybe beyond a prescribed pressure of the semiconductor switching devices 6–9, whereby the semiconductor switching devices 6–9 may be broken. To avoid such situation, belleville springs 30 or plate springs (not shown) are placed on one end of the semiconductor stack 18.

In such construction, if the bus-bars 15P, 15N and 14U that electrically connect the semiconductor switching devices 6–9 are made rigid, a satisfactory spring effect may not be obtained. Therefore, the bus-bars 15P, 15N and 14U have bend portions respectively, thereby producing a result of restraining a thermal stress caused by a thermal expansion.

In order to obtain more spring effect, the bus-bar itself may be annealed, thereby reducing a bad influence caused by a thermal expansion.

Even if an order of the components of the semiconductor stack 18 changes, a wiring structure of the snubber circuit 12 may be formed in the same way as the first embodiment.

(Second Embodiment)

Figure 9:
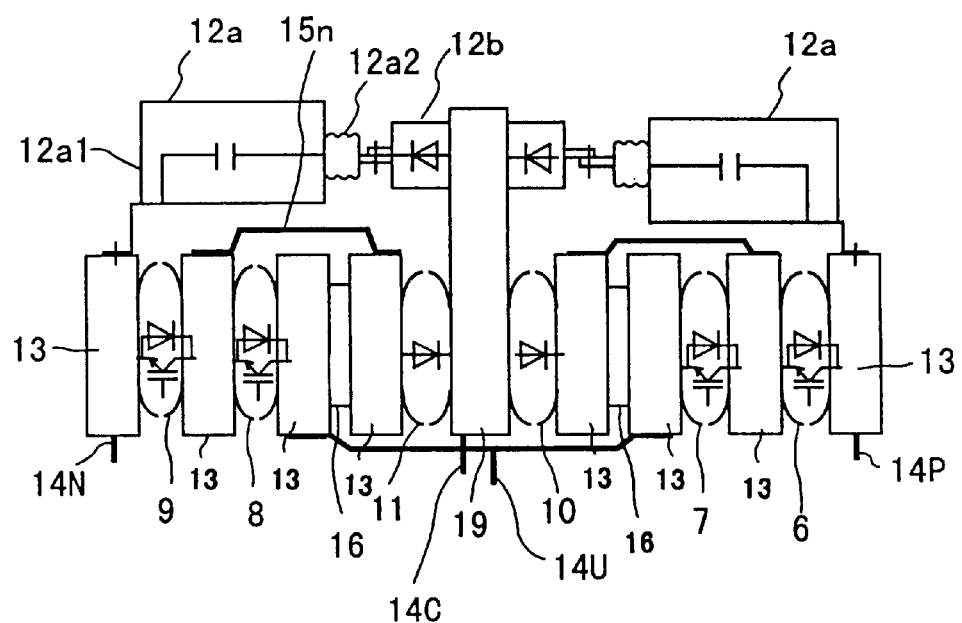
FIG. 9 is a schematic front view of a semiconductor stack of an NPC inverter apparatus of a second embodiment.

An NPC inverter apparatus of a second embodiment of the present invention is explained referring to FIG. 9.

In the second embodiment, a cooling fin 19 is substituted for the cooling fin 17 in the first embodiment. As shown in FIG. 9, one terminal of the snubber diode 12b is connected to the cooling fin 19 for refrigerating the snebber diode 12b. The cooling fin 19 also refrigerates the connecting diodes 10 and 11. Further, the cooling fin 19 also functions as an output terminal of a neutral point and includes a hole for connecting the neutral point bus-bar 14C. A depth of the cooling fin 19 is as wide as that of the cooling fin 13 in order to reduce a wiring inductance.

According to the second embodiment, since each of the cases 12a1 of the snubber capacitors 12a itself forms a terminal connected to the cooling fin 13 directly and the terminals of the snubber capacitors 12a are disposed adjacent to the semiconductor stack 18 so that magnetic flux generated by current flowing in the terminals cancels magnetic flux caused by current flowing in the semiconductor stack 18, a wiring inductance of the NPC inverter apparatus may be minimized, thereby restraining a surge voltage that applies to the semiconductor switching devices 6–9. As a result, it is unnecessary to provide a snubber circuit to each of the semiconductor switching devices 6–9.

According to the present invention, since a wiring inductance of the NPC inverter apparatus is minimized, a surge voltage may be restrained without attaching a snubber circuit to each of the semiconductor switching devices. That is, a surge voltage may be restrained by merely attaching a snubber circuit to a DC power source.

Further, wirings and components constituting a snubber circuit may be reduced in size. Furthermore, man-hours for assembly of the NPC inverter apparatus may be reduced.

Accordingly, since a surge voltage is restrained, it is possible to provide an economical and reliable power converter apparatus.

Various modifications and variations are possible in light of the above teachings. Therefore, it is to be understood that within the scope of the appended claims, the present invention may be practiced otherwise than as specifically described herein.

What is claimed is:

1. A power converter apparatus, comprising:

a DC power source;

a semiconductor stack, connected to said DC power source in parallel, having a plurality of semiconductor devices and a cooler for refrigerating said semiconductor devices, said semiconductor devices and said cooler are stacked and pressured to each other; and a snubber circuit, connected to said DC power source in parallel, having a serial circuit of a capacitor and a diode, and a resistor connected in parallel to said diode, one terminal of said capacitor is disposed adjacent to said semiconductor stack so that magnetic flux generated by current flowing in said terminal cancels magnetic flux caused by current flowing in said semiconductor stack.

2. The power converter apparatus as recited in claim 1, wherein said terminal of said capacitor is constituted by a case of said capacitor.

3. The power converter apparatus as recited in claim 2, wherein said case is connected to said cooler.

4. The power converter apparatus as recited in claim 2, wherein the other terminal of said capacitor is divided into plural terminals.

5. A power converter apparatus, comprising:

a DC power source having a positive electrode, a negative electrode and a neutral point;

a semiconductor stack, connected to said DC power source in parallel, having a first cooler coupled to said positive electrode, a second cooler coupled to said negative electrode and a plurality of semiconductor devices, said semiconductor devices and said first and second coolers are stacked and pressured to each other;

a first snubber circuit, connected between said positive electrode and said neutral point, having a first serial circuit of a first capacitor and a first diode, and a first resistor connected in parallel to said first diode; and a second snubber circuit, connected between said negative electrode and said neutral point, having a second serial circuit of a second capacitor and a second diode, and a second resistor connected in parallel to said second diode, one terminal of said first capacitor and one terminal of said second capacitor are disposed adjacent to said semiconductor stack so that magnetic flux generated by current flowing in said terminals of said first and second capacitors cancels magnetic flux caused by current flowing in said semiconductor stack.

6. The power converter apparatus as recited in claim 5, wherein said terminals of said first and second capacitors are constituted by cases of said first and second capacitors respectively.

7. The power converter apparatus as recited in claim 6, wherein said cases of said first and second capacitors are connected to said first and second coolers respectively.

8. The power converter apparatus as recited in claim 5, further comprising:

a third cooler coupled to said neutral point, one terminal on said first diode side of said first serial circuit and one terminal on said second diode side of said second serial circuit are connected to said third cooler.

9. The power converter apparatus as recited in claim 8, further comprising:

a bus-bar, connected to said neutral point, for functioning as an electrode of said semiconductor devices and fixing said third cooler on a fixing plane thereof, an area of said fixing plane is equal to or larger than an area of a fixing plane of said third cooler.

* * * * *